(12) United States Patent
Lee et al.

(10) Patent No.: US 8,830,919 B2
(45) Date of Patent: Sep. 9, 2014

(54) CHANNEL ESTIMATION APPARATUS OF MOBILE COMMUNICATION RECEIVER AND TIME TRACKING METHOD FOR CHANNEL ESTIMATION

(75) Inventors: Jae Hong Lee, Seoul (KR); Young Min Ki, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 608 days.

(21) Appl. No.: 12/793,057

(22) Filed: Jun. 3, 2010

(65) Prior Publication Data

US 2010/0309890 A1    Dec. 9, 2010

(30) Foreign Application Priority Data

Jun. 4, 2009    (KR) .................. 10-2009-0049288

(51) Int. Cl.
*H04W 4/00*    (2009.01)
*H03H 7/30*    (2006.01)
*H04B 1/7113*    (2011.01)

(52) U.S. Cl.
CPC ................................ *H04B 1/7113* (2013.01)
USPC ........... 370/329; 370/203; 370/336; 370/343; 375/229; 375/239

(58) Field of Classification Search
USPC ......... 370/203–211, 264, 329, 336, 341, 343; 375/229–236
See application file for complete search history.

(56) References Cited

U.S. PATENT DOCUMENTS

| | | | |
|---|---|---|---|
| 2001/0046221 A1* | 11/2001 | Ostman et al. ............... | 370/335 |
| 2003/0235238 A1* | 12/2003 | Schelm et al. ............... | 375/148 |
| 2008/0175140 A1* | 7/2008 | Mudulodu et al. ........... | 370/210 |
| 2009/0245333 A1* | 10/2009 | Krishnamoorthi et al. ... | 375/219 |
| 2009/0296798 A1* | 12/2009 | Banna et al. ................. | 375/229 |
| 2009/0304063 A1* | 12/2009 | Ki et al. ....................... | 375/232 |
| 2010/0309890 A1* | 12/2010 | Lee et al. ...................... | 370/336 |

FOREIGN PATENT DOCUMENTS

KR    10-2009-0126352 A    12/2009

OTHER PUBLICATIONS

International Search Report for WO2010074474—PCT/KR2009/007649 published Jul. 6, 2010, mailed Jul. 29, 2010.*

* cited by examiner

*Primary Examiner* — Benjamin H Elliott, IV
(74) *Attorney, Agent, or Firm* — Jefferson IP Law, LLP

(57) ABSTRACT

A time tracking method is provided for channel estimation of a mobile communication receiver and a related channel estimation apparatus is provided. The channel estimation apparatus includes a channel estimation control unit for analyzing and outputting a delay profile of a multipath channel by using a channel estimation value of each multi-tap, a tracking mode control unit for calculating a distance between an earliest tap and a preset margin tap by using the delay profile analysis results, and for generating and outputting a hopping tracking control signal for tracking a position of the earliest tap to a position of the margin tap at a time when the determined distance is greater than a preset hopping threshold value, and a hopping tracking mode execution unit for receiving the hopping tracking control signal and for shifting the position of the earliest tap to the position of the margin tap at a time.

18 Claims, 12 Drawing Sheets

FIG. 12
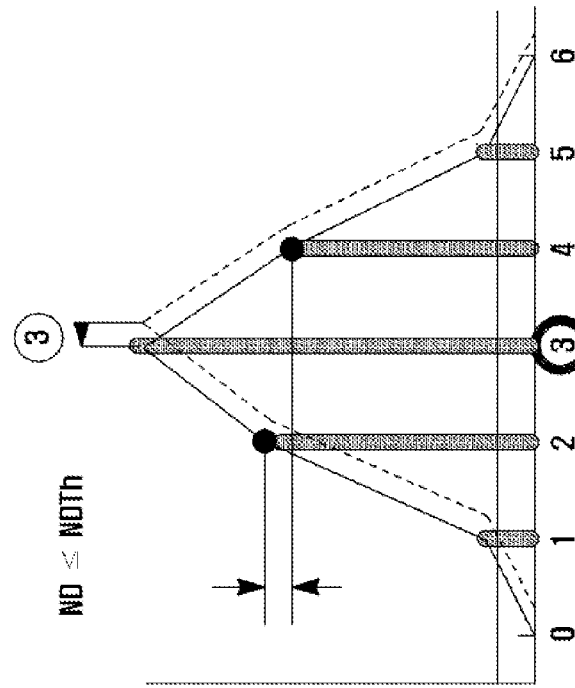
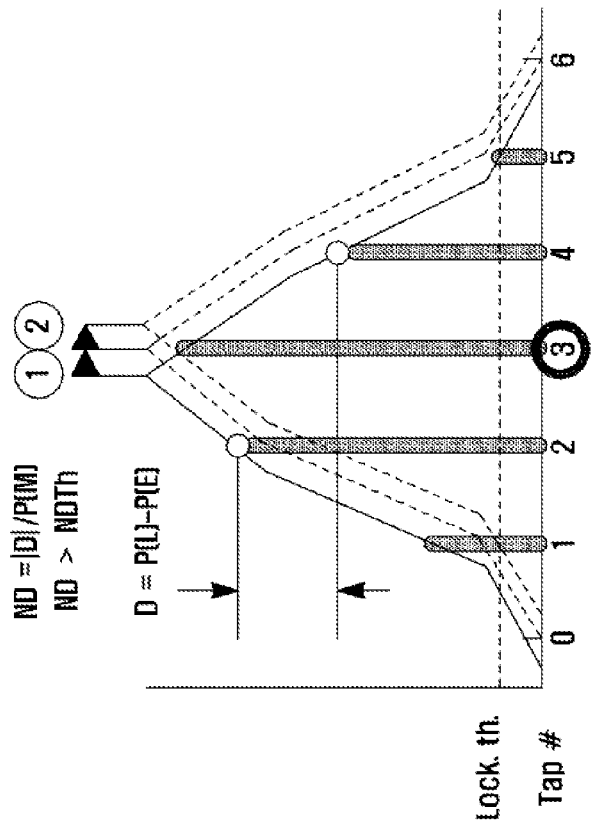

CHANNEL ESTIMATION APPARATUS OF MOBILE COMMUNICATION RECEIVER AND TIME TRACKING METHOD FOR CHANNEL ESTIMATION

This application claims the benefit under 35 U.S.C. §119 (a) of a Korean patent application filed on Jun. 4, 2009 in the Korean Intellectual Property Office and assigned Serial No. 10-2009-0049288, the entire disclosure of which is hereby incorporated by reference.

BACKGROUND OF THE INVENTION

1. Field of the Invention

The present invention relates to a time tracking technique for channel estimation of a mobile communication receiver. More particularly, the present invention relates to a time tracking method and apparatus in which a tap position of a channel estimator is shifted to a maximum peak power position when a delay profile of a received multipath signal is varied due to an obstacle or a high-speed movement of a receiver.

2. Description of the Related Art

As high-speed mobile communication systems such as High Speed Packet Access (HSPA) or Wideband Code Division Multiple Access (W-CDMA) of the $3^{rd}$ Generation Partnership Project (3GPP) have been recently standardized and commercialized, equalizer-based receivers suitable for high-speed transmitted signals are being researched and developed in various forms.

Normally, such an equalizer-based receiver is composed of a channel estimator and an adaptive equalizer. A channel estimator has been proposed that has a long enough tap to obtain all delay profiles of signals received via a multipath. In addition, an algorithm for an adaptive equalizer is being developed to use estimated multi-tap channel values. For example, considering a delay profile of a multipath channel, a conventional receiver is designed to have a sufficiently long tap and also uses a technique to activate or inactivate taps of a channel estimator according to the state of the channel.

Another proposed channel estimator and equalizer employ a 2× chip rate self-tracking technique. This technique analyzes properties of a delay profile of a multipath receiving channel and, in order to perform a slew control, shifts tap positions of a channel estimator and equalizer by a half chip according to channel variations. This technique reduces performance loss which may often be incurred in an equalizer-based receiver using fixed taps when a delay profile of a received multipath signal is varied due to an obstacle or a high-speed movement of a receiver.

In a slew control method of the related art, tracking is performed by adjusting tap positions at intervals of only a half chip when energy distribution of a multipath fading channel is varied. More particularly, tracking of tap positions is always performed at intervals of a half chip even though the position of the maximum peak power disagrees with that of a pre-allocated multi-tap (i.e., a reference tap). However, this may deteriorate channel estimation capability due to great difficult in performing fast tracking.

Therefore, a need exists for an advanced slew control technique which allows a fast agreement between positions of maximum peak power and a pre-allocated multi-tap.

SUMMARY OF THE INVENTION

An aspect of the present invention is to address the above-mentioned problems and/or disadvantages and to provide at least the advantages described below. Accordingly, an aspect of the present invention is to provide a quick shift position of an earliest arrived tap among multipath receiving taps activated after initial allocation of a reference tap to an optimal position in an entire tap window of a channel estimator.

Another aspect of the present invention is to provide a slew control technique for tracking at a time or on a 1/M chip basis according to a total displacement size for tracking.

According to an aspect of the present invention, a channel estimation apparatus for executing time tracking in a mobile communication system is provided. The apparatus includes a channel estimation control unit for analyzing and outputting a delay profile of a multipath channel by using a channel estimation value of each multi-tap of a plurality of multi-taps, a tracking mode control unit for determining a distance between an earliest tap and a preset margin tap by using the delay profile analysis results, and for generating and outputting a hopping tracking control signal for tracking a position of the earliest tap to a position of the margin tap at a time when the determined distance is greater than a preset hopping threshold value, and a hopping tracking mode execution unit for receiving the hopping tracking control signal and for shifting the position of the earliest tap to the position of the margin tap at a time.

According to another aspect of the present invention, a time tracking method for a channel estimation of a mobile communication receiver is provided. The method includes analyzing a delay profile of a multipath channel by estimating a channel for a received multipath signal, determining a distance between an earliest tap and a preset margin tap by using the delay profile, and performing hopping tracking for tracking a position of the earliest tap to a position of the margin tap at a time when the determined distance is greater than a preset hopping threshold value.

Accordingly, tracking may be allowed at a time or several times on a 1/M chip basis according to a total displacement size for tracking when a delay profile of a received multipath signal is varied due to an obstacle or a high-speed movement of a receiver, thus reducing performance loss in channel estimation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 12 is a view illustrating an executable example of a fine tracking mode according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the present invention, the drawings are not necessarily to scale and certain features may be exaggerated or omitted in order to better illustrate and explain exemplary embodiments of the present invention.

Figure 1:
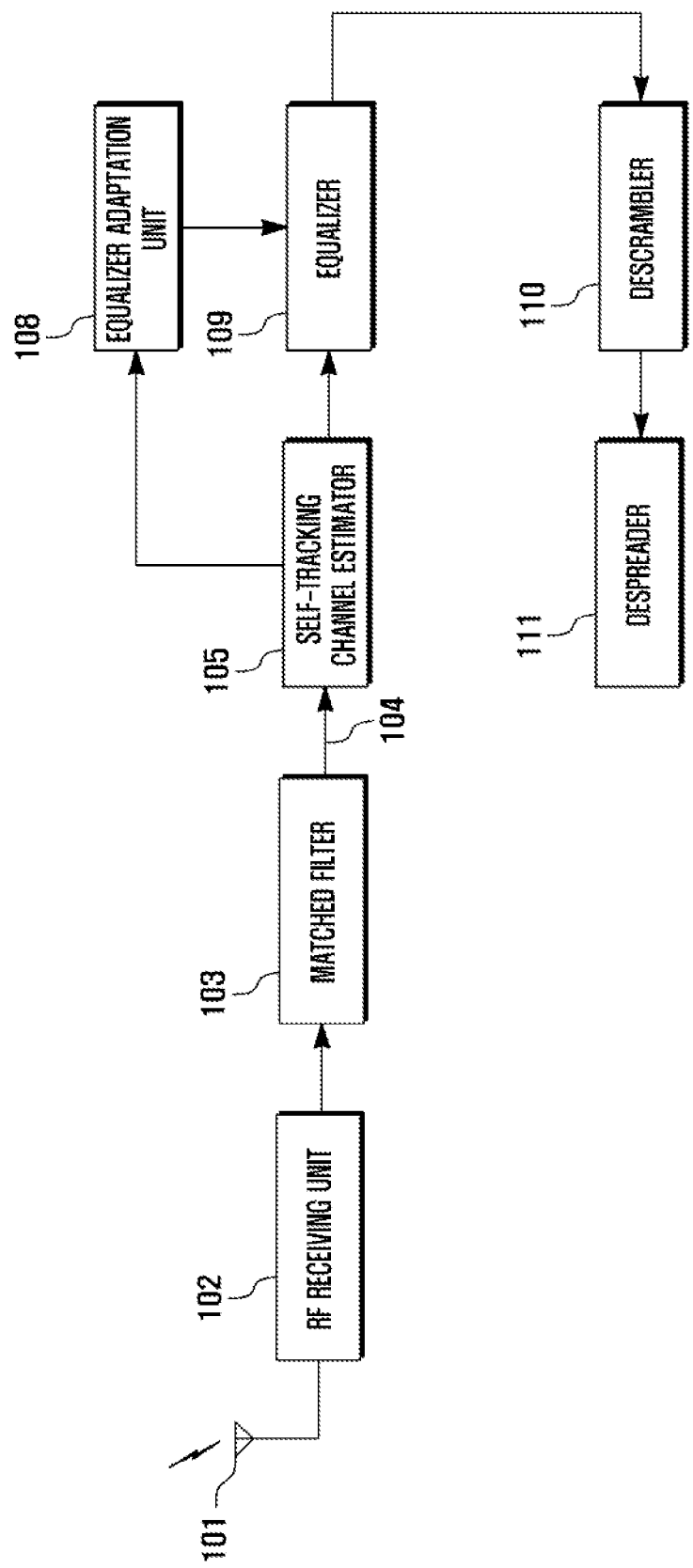
FIG. 1 is a block diagram illustrating a mobile communication receiver using both a self-tracking channel estimator and an equalizer according to an exemplary embodiment of the present invention.

FIG. 1 is a block diagram illustrating a mobile communication receiver using both a self-tracking channel estimator and an equalizer according to an exemplary embodiment of the present invention.

Referring to FIG. 1, the receiver includes an antenna 101, a Radio Frequency RF receiving unit 102, a matched filter 103, a self-tracking channel estimator 105, an equalizer adaptation unit 108, an equalizer 109, a descrambler 110, and a despreader 111.

The matched filter 103 performs matched filtering between a given reference signal and a signal received through the antenna 101 and the RF receiving unit 102. A resultant digital signal 104 is delivered to the self-tracking channel estimator 105.

The self-tracking channel estimator 105 performs inverse transform for a particular signal, such as a pilot signal, with a well-known transmission pattern and then estimates a channel by using a correlation with an original data signal. More particularly, the self-tracking channel estimator 105 estimates a channel state with a transmitter by activating or inactivating individual taps disposed at intervals of a half chip according to a received energy distribution. In an exemplary implementation, the self-tracking channel estimator 105, configured as a channel estimation apparatus 200 illustrated in FIG. 2, performs tracking at a time or several times on a 1/N chip basis according to a total displacement size for tracking. The self-tracking channel estimator 105 will be described in more detail below.

The equalizer adaptation unit 108 determines an equalizer tap gain, namely a filter coefficient required for the equalizer, by using multiple taps estimated in the self-tracking channel estimator 105 and delivers the equalizer tap gain to the equalizer 109.

The equalizer 109 performs an equalizing operation based on the equalizer tap gain provided by the equalizer adaptation unit 108, compensates for distortion of a received multipath signal provided by the self-tracking channel estimator 105, and delivers a distortion-compensated signal to the descrambler 110.

The descrambler 110 descrambles the distortion-compensated signal and provides the descrambled signal to the despreader 111. The despreader 111 despreads the signal received from the descrambler 110.

Namely, a received signal passes through the antenna 101, the RF receiving unit 102 and the matched filter 103, thus becoming a digital signal 104. The digital signal 104 passes through the self-tracking channel estimator 105, the equalizer 109, the descrambler 110 and the despreader 111 one by one, thereby being restored to an information signal.

Figure 2:
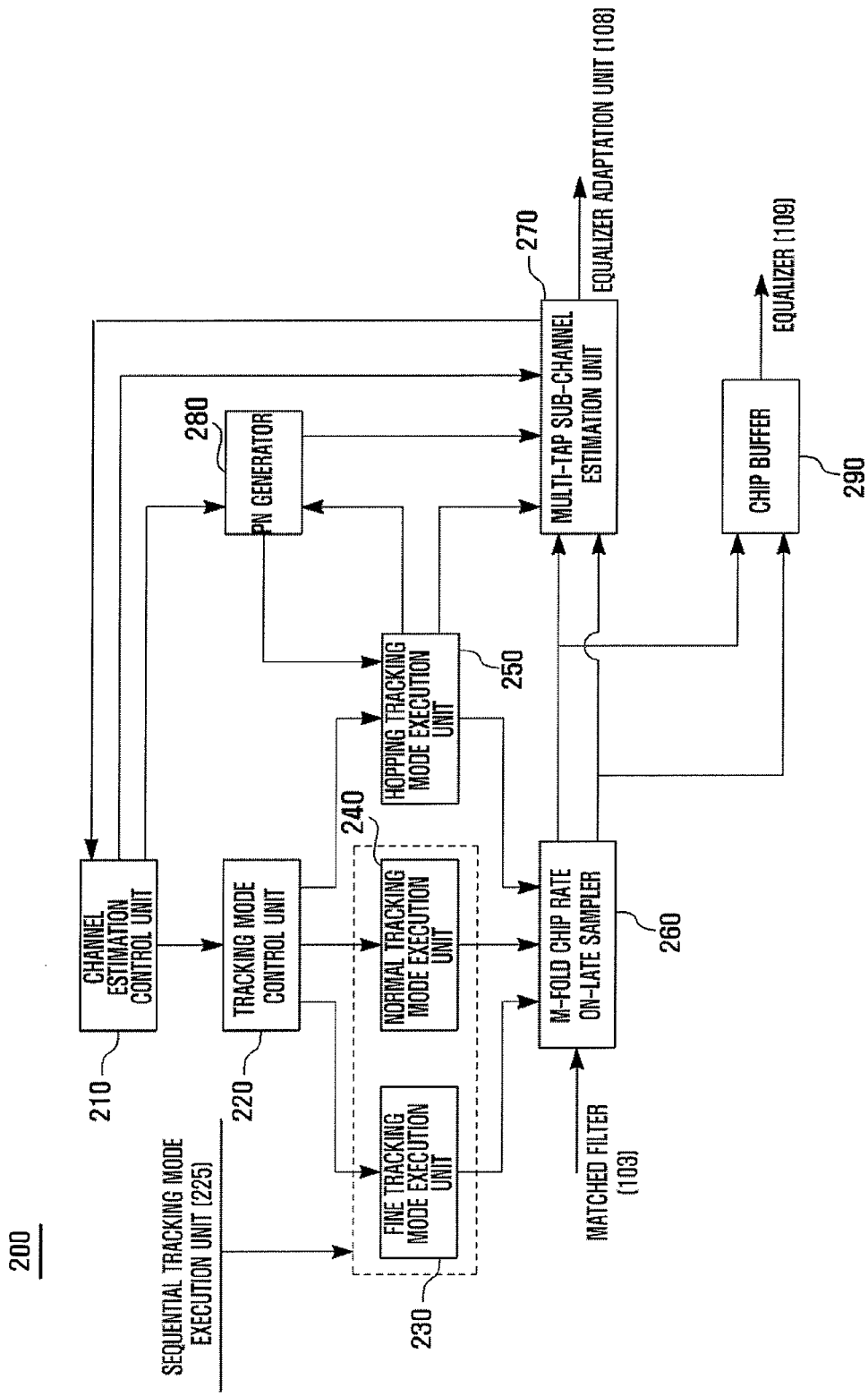
FIG. 2 is a block diagram illustrating a channel estimation apparatus according to an exemplary embodiment of the present invention.

FIG. 2 is a block diagram illustrating a channel estimation apparatus according to an exemplary embodiment of the present invention. More particularly, the channel estimation apparatus 200 illustrated in FIG. 2 may correspond to the self-tracking channel estimator 105 illustrated in FIG. 1.

Referring to FIG. 2, the channel estimation apparatus 200 includes a channel estimation control unit 210, a tracking mode control unit 220, a sequential tracking mode execution unit 225 including a fine tracking mode execution unit 230 and a normal tracking mode execution unit 240, a hopping tracking mode execution unit 250, an M-fold chip rate on-late sampler 260, a multi-tap sub-channel estimation unit 270, a Pseudo-Noise (PN) generator 280, and a chip buffer 290.

The channel estimation control unit 210 controls overall operations of a channel estimation process in the equalizer-based channel estimation apparatus according to an exemplary embodiment of the present invention. More specifically, the channel estimation control unit 210 receives channel values estimated by the multi-tap sub-channel estimation unit 270, analyzes channel properties, and performs several operations such as a multi-tap energy determination, a multi-tap lock control, a Doppler estimation, a delay profile analysis, and a slewing control.

The channel estimation control unit 210 determines whether to perform a slew control by comparing a maximum peak power position with a pre-allocated multi-tap position. Accordingly, the channel estimation control unit 210 analyzes energy regarding each channel tap of the multi-tap sub-channel estimation unit 270 and analyzes a multipath delay profile. The channel estimation control unit 210 determines a time average power of a received energy and a moving average energy at a channel estimation start time.

The moving average energy in an n-th channel tap at time t may be obtained using Equation 1 below.

$$MA_n(t) = \frac{1}{N_{MA}} \sum_{i=n}^{n+N_{MA}-1} P_n(t) \quad \text{[Equation 1]}$$

Here, $N_{MA}$ denotes a moving average window size and may be a smaller value than the number N of channel taps for n=1, 2, ..., N. Also, $P_n(t)$ denotes the time average power obtained using a time average in the n-th channel tap at time t.

After the moving average is determined in Equation 1, the channel estimation control unit 210 may determine the maximum peak power position by using Equation 2 below.

$$n_{max}(t) = \underset{n}{\operatorname{argmax}} MA_n(t) \quad \text{[Equation 2]}$$

After the maximum peak power position is determined, the channel estimation control unit 210 determines whether to perform a slew control by comparing the maximum peak power position with a pre-allocated multi-tap position, namely a reference tap position n(ref). If the maximum peak power position is not identical to the reference tap position, namely if a multipath delay profile is varied according to time, the channel estimation control unit 210 slews the maximum peak power position to a front or rear tap so that the maximum peak power position may agree with the reference tap position.

Such a slew control may be classified into negative slewing and positive slewing. The negative slewing is to increase a PN code phase of the receiver by a half tap so that it may be in accord with a phase of a received signal. The positive slewing is to decrease a PN code phase of the receiver by a half tap so that its phase may compound with a phase of the received signal.

The negative slewing is required when the maximum peak power position is smaller than the reference tap position. The positive slewing is required when the maximum peak power position is greater than the reference tap position. The slewing determination depends on Equation 3 below.

$$Slew = \begin{cases} -1, & \text{if } n_{max}(t) < n_{ref} \\ 1, & \text{if } n_{max}(t) > n_{ref} \\ 0, & \text{otherwise} \end{cases} \quad \text{[Equation 3]}$$

Here, −1 denotes the negative slewing, and 1 denotes the positive slewing.

Slewing control may depend on a moving average window size. A larger size of a moving average window employs a broader range of power as the criterion for determining slewing. Therefore, slewing is performed at a lower frequency. On the contrary, a smaller size of a moving average window employs a narrower range of power as the criterion for determining slewing. Therefore, slewing is performed at a higher frequency.

The tracking mode control unit 220 selectively controls the hopping tracking mode execution unit 250 or the sequential tracking mode execution unit 225, based on analysis results of a delay profile output from the channel estimation control unit 210. Accordingly, the tracking mode control unit 220 determines a tracking mode according to a total displacement size for tracking and further determines a tracking rate of a tracking mode. More specifically, the tracking mode control unit 220 generates and outputs a hopping tracking control signal when the channel estimation apparatus 200 may operate in a hopping tracking mode, or generates and outputs a sequential tracking control signal when the channel estimation apparatus 200 may operate in a sequential tracking mode. A sequential tracking control signal may be a normal tracking control signal or a fine tracking control signal.

The sequential tracking mode execution unit 225 sequentially shifts a multi-tap position to any position on a 1/N chip basis. More particularly, the sequential tracking mode execution unit 225 includes the fine tracking mode execution unit 230 and the normal tracking mode execution unit 240.

If receiving a fine tracking control signal from the tracking mode control unit 220, the fine tracking mode execution unit 230 shifts the maximum energy receiving tap according to resolution on a 1/M chip basis by using a difference in a received energy between a half-chip prior tap and a half-chip post tap to the maximum energy receiving tap. Here, M denotes an integer with a value of more than 2, and equals 4, 8, 16, and the like.

If receiving a normal tracking control signal from the tracking mode control unit 220, the normal tracking mode execution unit 240 regulates a rate so that the channel estimation apparatus 200 may track variations in a multi-tap energy distribution at the lowest power, and performs tracking on a ½ chip basis at a regular tracking rate.

If a hopping tracking control signal is received from the tracking mode control unit 220, the hopping tracking mode execution unit 250 performs tracking at a time to a tap displacement to be shifted at a given hopping rate. If more than ½ chip is shifted at a time, PN state values used as criterion for selecting specific data should be changed. Therefore, in a case of tracking more than several chips, a PN state should be updated in hopping tracking.

The M-fold chip rate on-late sampler 260 performs sampling of a received signal delivered from a transmitter according to multi-tap. More specifically, the M-fold chip rate on-late sampler 260 classifies an input signal of M-fold chip rate into an on-sample of 1× chip rate and a late sample, based on a tracking mode determined by the tracking mode control unit 220. The M-fold chip rate on-late sampler 260 applies a classified sample signal to the multi-tap sub-channel estimation unit 270.

The multi-tap sub-channel estimation unit 270 outputs a channel estimation value for each multi-tap to the channel estimation control unit 210 and the equalizer adaptation unit 108 by using a sampling signal received from the M-fold chip rate on-late sampler 260. In an exemplary implementation, an inter-tap distance of a multi-tap may correspond to a half chip size. Therefore, the multi-tap sub-channel estimation unit 270 obtains channel estimation values of multiple taps with an interval of half chip through a plurality of sub-channel estimators. The multi-tap sub-channel estimator unit 270 provides the channel estimation values to the channel estimation control unit 210. Additionally, the multi-tap sub-channel estimation unit 270 activates or inactivates each multi-tap according to lock information received from the channel estimation control unit 210 and provides each multi-tap to the channel estimation control unit 210 and the equalizer adaptation unit 108.

In a case of channel estimation, the multi-tap sub-channel estimation unit 270 does not use a conventional scheme for adding a previous value and a current value of the same tap. Instead, the multi-tap sub-channel estimation unit 270 performs addition in consideration of shift displacement of such taps. For instance, if a fifth tap is slewed to a third tap, a channel estimation value of the current third tap should be added to accumulated channel estimation values of the previous fifth tap.

The PN generator 280 generates PN signals including scrambling codes required despreading, Orthogonal Variable Spreading Factor (OVSF) codes, and antenna patterns and then provides the PN signals to the multi-tap sub-channel estimation unit 270 so that a pilot signal may be restored by the multi-tap sub-channel estimation unit 270. More particularly, the PN generator 280 controls the output of PN signals according to a slewing signal input from the channel estimation control unit 210.

The chip buffer 290 saves in order an on-sample and a late sample input from the M-fold chip rate on-late sampler 260 and outputs on-sample and a late sample in the same order. Namely, the chip buffer 290 operates as a First Input First Output (FIFO) buffer. The chip buffer 290 temporarily stores a data signal for a given delay time and then outputs the data signal such that the data signal of the M-fold chip rate on-late sampler 260 may be input to the equalizer 109 at the same time when an equalizer tap gain of the equalizer adaptation unit 108 is input.

Figure 3:
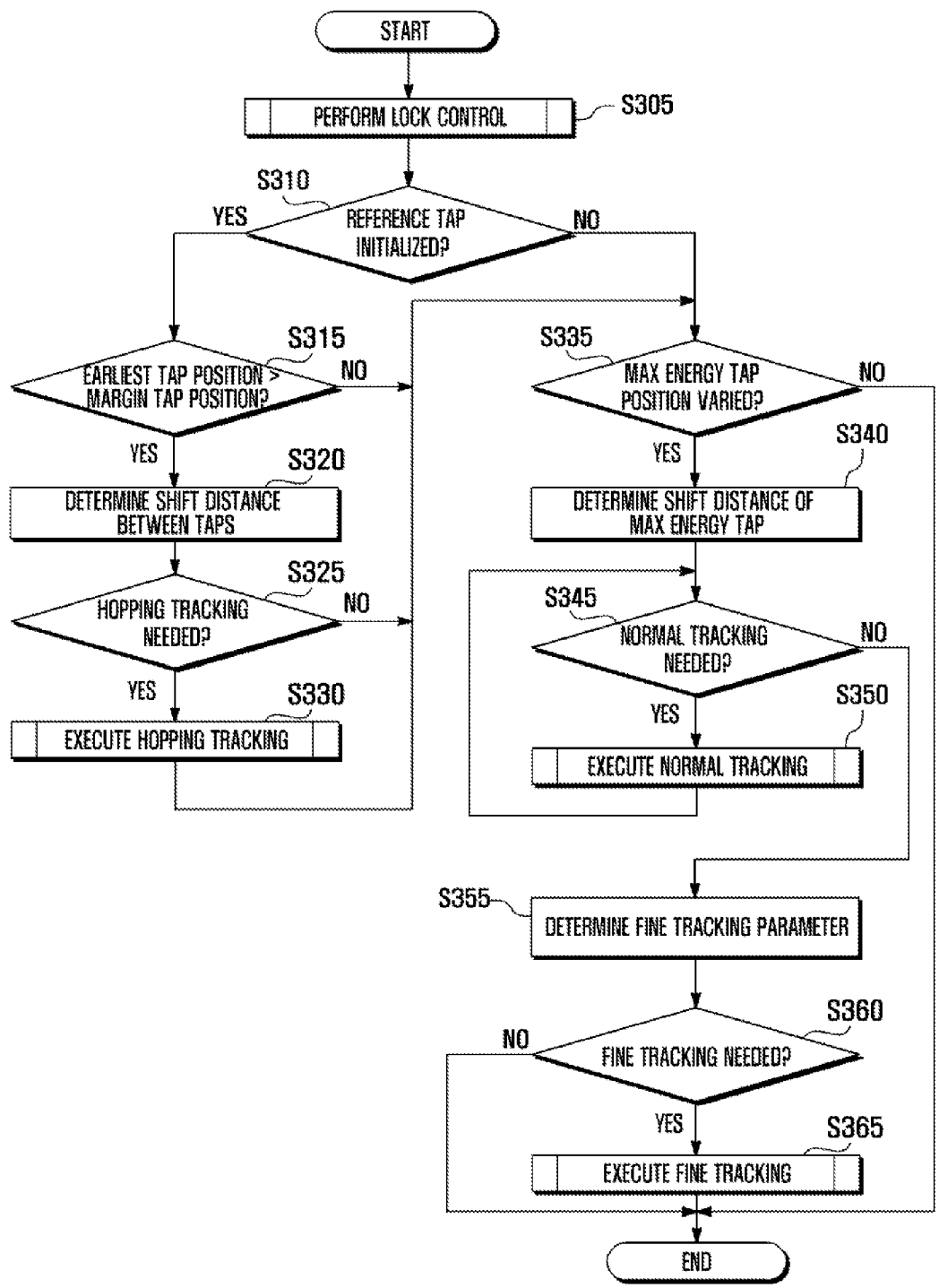
FIG. 3 is a flow diagram illustrating a time tracking method for channel estimation according to an exemplary embodiment of the present invention.

FIG. 3 is a flow diagram illustrating a time tracking method for channel estimation according to an exemplary embodiment of the present invention.

Referring to FIG. 3, at an outset, a channel estimation control unit 210 performs a lock control process in step S305. A more detailed flow diagram of the lock control process is illustrated in FIG. 4.

Figure 4:
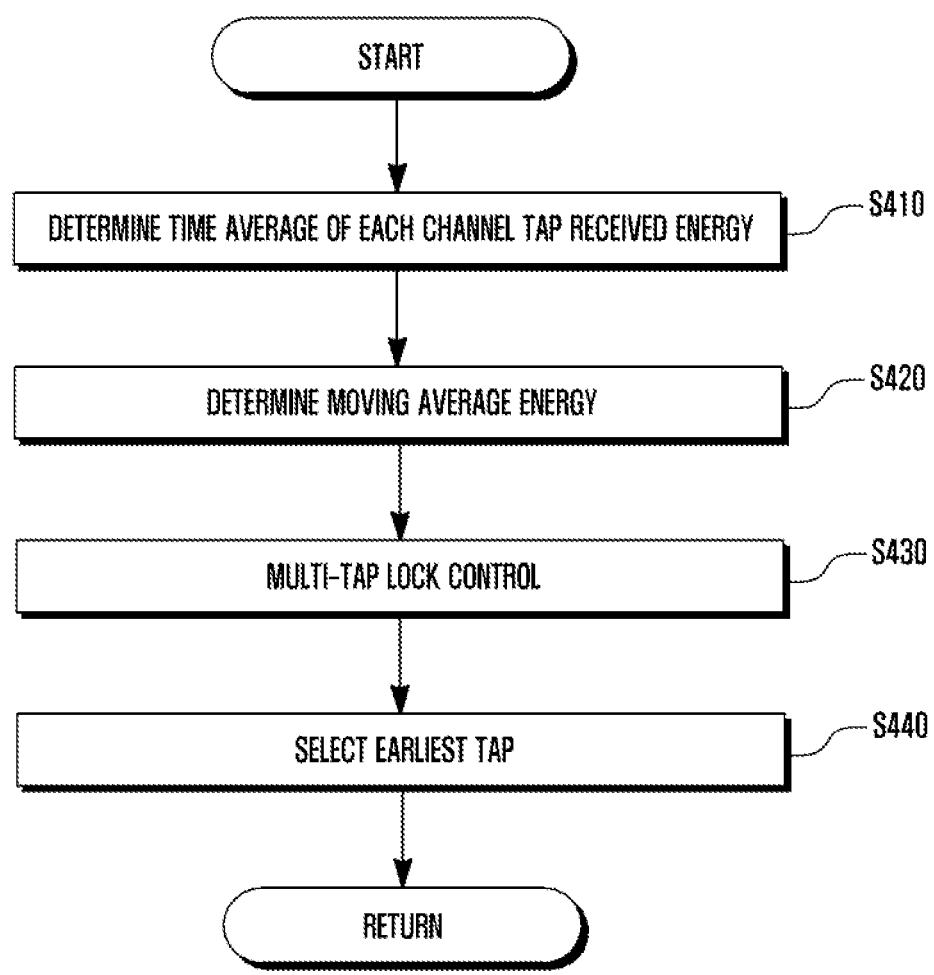
FIG. 4 is a flow diagram illustrating a lock control process in FIG. 3.

FIG. 4 is a flow diagram illustrating the lock control process in FIG. 3.

The channel estimation control unit 210 determines a time average of each channel tap received energy in step S410. This time average may be obtained using Equation 4 below.

$$P_{tot}(t) = \sum_{n=1}^{N} P_n(t)$$ [Equation 4]

Here, $P_{tot}(t)$ denotes the sum of time average power at any time t, and $P_n(t)$ denotes the time average power of a n-th channel tap.

The channel estimation control unit 210 then determines a moving average energy by using Equation 1 in step S420. In addition, the channel estimation control unit 210 determines whether to lock each multi-tap by comparing the moving average energy and a preset lock threshold value for multi-tap in step S430.

Figure 10:
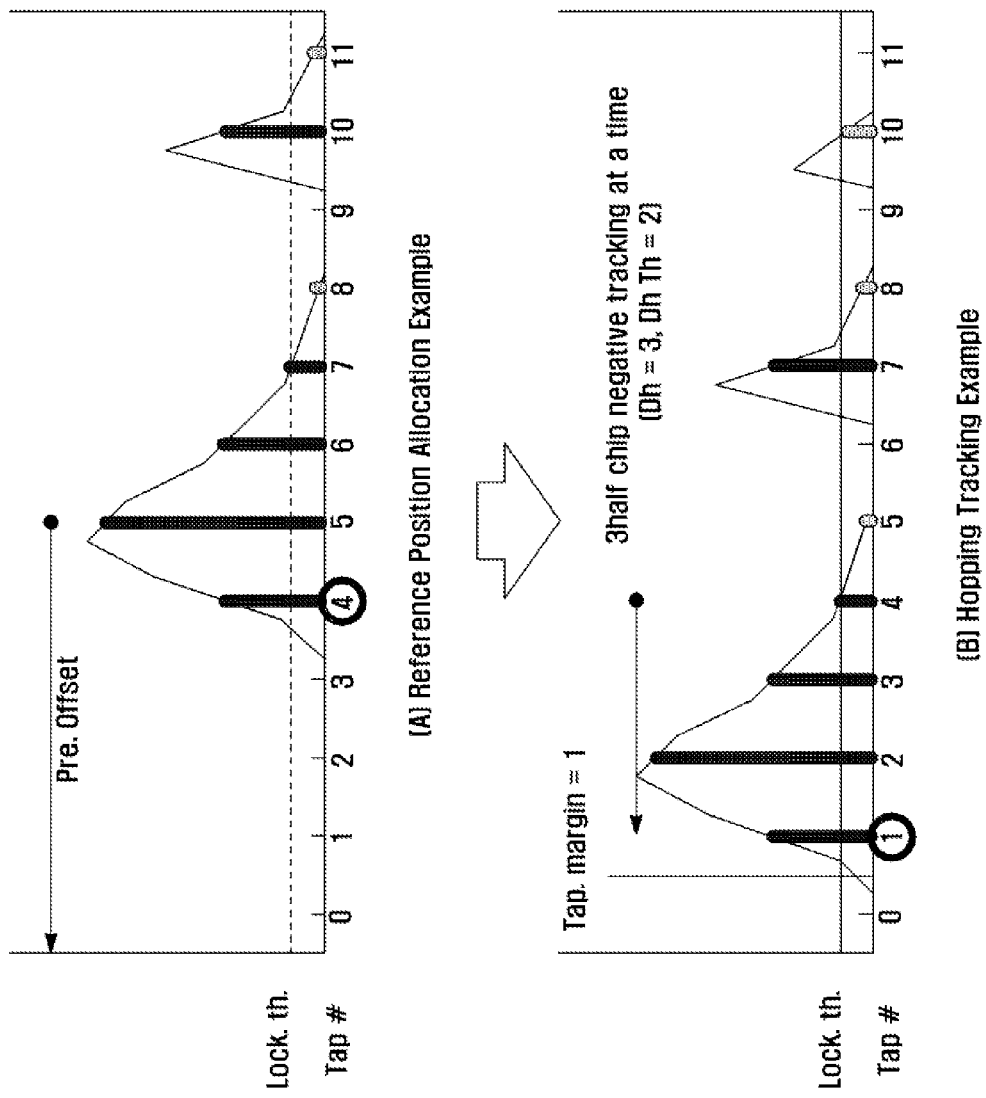
FIG. 10 is a view illustrating an executable example of a hopping tracking mode according to an exemplary embodiment of the present invention.

The channel estimation control unit 210 determines the earliest tap in step S440. The earliest tap is the most preceding tap (i.e., with the lowest tap number) among channel estimation taps having valid energy values as the result of a lock control in step S305. Referring to FIG. 10, which will be described in more detail below, the earliest tap may be a fourth tap in (A). Namely, channel estimation taps after the fourth tap in (A) have energy greater than a lock threshold value, and the fourth tap, which is the most preceding tap among the taps, becomes the earliest tap.

Returning to FIG. 3, the tracking mode control unit 220 selects a tracking mode according to a total displacement size for tracking.

The tracking mode control unit 220 determines whether a reference tap is initialized in step S310. This is to determine whether a reference tap which is allocated by a searcher of a channel estimation apparatus 200 is initially allocated or reallocated, namely whether the position of a reference tap is varied. If a reference tap is initialized or varied, a reference position for channel estimation is changed. Therefore, channel estimation may be determined from that position, namely the position of the reference tap. Since the position of the reference tap is normally flexible within a single frame of a Common PIlot CHannel (CPICH), there is a strong possibility that the maximum peak power position disagrees with the position of the reference tap. In this case, a conventional ½ chip tracking technique allows tracking at ½ chip rate per frame. However, a hopping tracking technique allows a shift of all multiple taps at a time to a desired position. For this, the tracking mode control unit 220 performs subsequent steps from step S315 and thus determines whether to perform a hopping tracking mode.

More specifically, the tracking mode control unit 220 compares the position of the earliest tap with the position of a margin tap in step S315. A margin tap is a preset value to prepare for a possibility of finding a received energy greater than a lock threshold value in any tap before the locked earliest tap. Such a margin tap may be set for an arbitrary value and normally set for zero.

If the earliest tap position is greater than the margin tap position, the tracking mode control unit 220 determines a shift distance Dh between the earliest tap position and the margin tap position in step S320. This is to allow the channel estimation apparatus 200 to receive the largest multi-tap energy distribution. The shift distance may be denoted as Equation 5 below.

$$Dh = POS(\text{EARLIEST TAP}) - POS(\text{MARGIN TAP})$$ [Equation 5]

Using the shift distance Dh obtained in Equation 5, the tracking mode control unit 220 determines whether to execute a hopping tracking mode in step S325. More specifically, the tracking mode control unit 220 compares a preset hopping threshold value DhTh with the shift distance Dh. Also, the tracking mode control unit 220 determines whether the shift distance Dh is more than several chips and whether hopping tracking is needed instead of a 1/N tracking requiring much time.

If the tracking mode control unit 220 determines that hopping tracking is needed, the hopping tracking mode execution unit 250 executes a hopping tracking process in step S330. The hopping tracking process in step S330 is described in more detail below.

If a reference tap is not initialized in step S310, if the earliest tap position is smaller than the margin tap position in step S315, or if a hopping tracking is not needed in step S325, the tracking mode control unit 220 determines whether a 1/N tracking is needed in step S335.

For this, the tracking mode control unit 220 determines in step S335 whether the position of a tap with the maximum received energy is varied. If a tap position is varied, the tracking mode control unit 220 determines a shift distance Dp of a tap with the maximum received energy in step S340. Here, since the channel estimation apparatus 200 measures each tap energy at intervals of half chip, a position shift of a tap with the maximum received energy has resolution on a half chip basis. The tracking mode control unit 220 determines whether normal tracking is needed, namely whether a tracking on a ½ chip basis is needed in step S345. If a shift distance Dp is zero, namely if the position of a tap with the maximum received energy is not shifted on a half chip basis, the tracking mode control unit 220 does not execute normal tracking and instead determines whether to execute fine tracking in step S360.

On the contrary, if a shift distance Dp is not zero, the tracking mode control unit 220 controls the normal tracking mode execution unit 240 to execute a normal tracking process in step S350. The normal tracking process in step S350 is described in more detail below.

If a normal tracking mode has already been executed, or if a normal tracking mode is not needed, the tracking mode control unit 220 proceeds with step S355. In step S355, the tracking mode control unit 220 determines a fine tracking parameter ND to be used for determining whether a fine tracking mode is needed for a much finer tracking on a 1/M chip basis.

A fine tracking parameter ND is a value normalized after dividing a difference in a received energy between a half-chip prior tap and a half-chip post tap to the maximum received energy tap by a received energy of the maximum received energy tap. A fine tracking parameter ND is determined using Equation 6 below.

$$ND=|P(L)-P(E)|/P(M)$$ [Equation 6]

Here, P(E) is a received energy of a half-chip prior tap to the maximum received energy tap, and P(L) is a received energy of a half-chip post tap to the maximum received energy tap. Also, P(M) is a received energy of the maximum received energy tap.

Additionally, the tracking mode control unit 220 compares a fine tracking parameter ND with a preset fine tracking threshold value NDTh in step S360. If a fine tracking parameter is greater, the tracking mode control unit 220 controls the fine tracking mode execution unit 230 to execute a fine tracking process in step S365. The fine tracking process in step S365 is described in more detail below.

Figure 5:
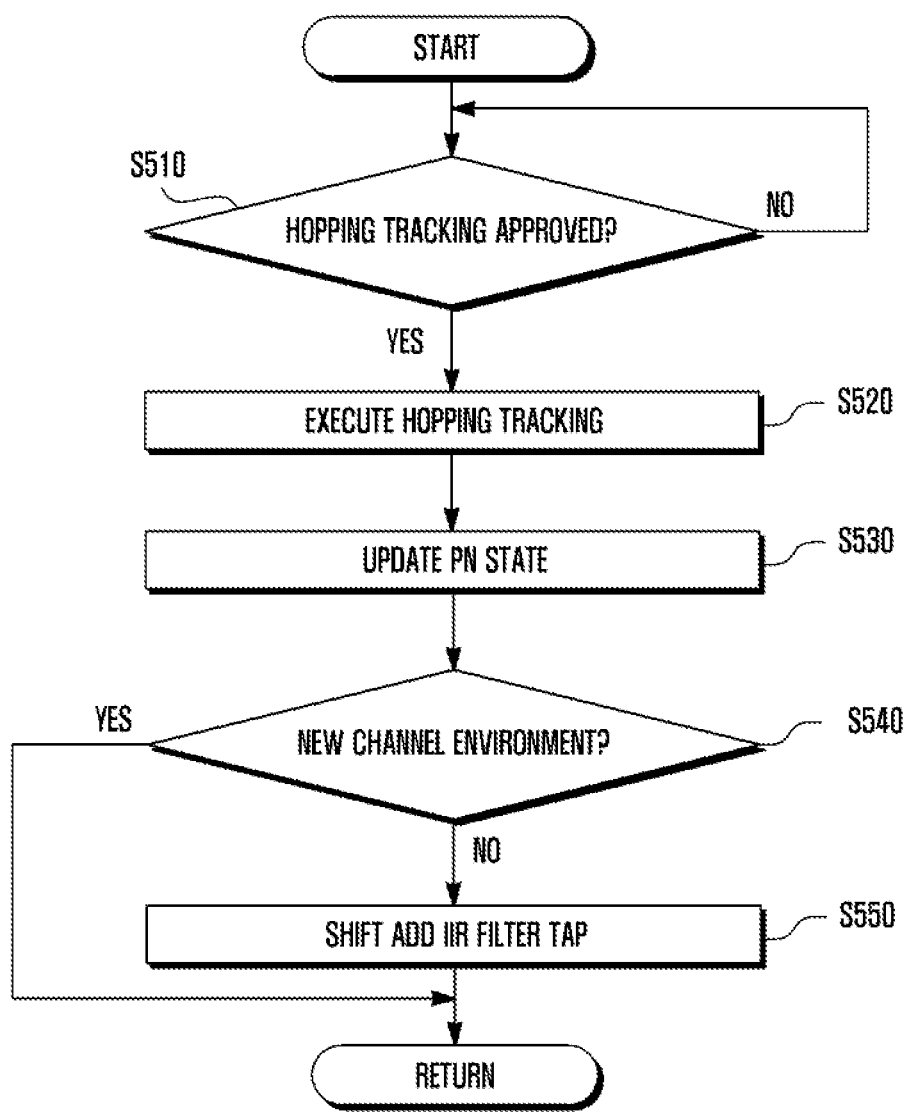
FIG. 5 is a flow diagram illustrating a hopping tracking process in FIG. 3.

FIG. 5 is a flow diagram illustrating a hopping tracking process in FIG. 3.

Referring to FIG. 5, the hopping tracking execution unit 250 determines whether hopping tracking is approved in step S510. If it is determined that the hopping tracking is approved, the hopping tracking execution unit 250 executes hopping tracking in step S520, namely the hopping tracking execution unit 250 shifts the position of the earliest tap to that of a margin tap at a time. The direct shift of a tap position is possible by shifting a counter for internal timing generation to a given position compared to a reference counter of free running and then initializing the given position. Also, the direct shift of a tap position is possible by initializing respective control signals from a frame boundary of CPICH to a PN generation boundary based on that time.

Since a PN state used as criterion for selecting specific data is suddenly changed, the hopping tracking execution unit 250 updates a PN state in step S530. Such a PN state update technique includes means to update using software and means to update in hardware at a given update time after saving values in a Read-Only Memory (ROM) table. In the updating in the hardware, as a way to reduce the ROM table, PN state update time may be restricted to limited points such as slots, sub-frames or frame boundaries rather than each PN clock. In succession, only corresponding numbers may be stored and applied to relevant boundaries.

Thereafter, the hopping tracking execution unit 250 determines whether a shift distance Dh of a tap exceeds a preset threshold value, namely whether to interpret a channel environment as a new one in step S540. If a shift distance Dh of a tap is smaller than a preset threshold value, the hopping tracking execution unit 250 adds internal Infinite Impulse Response (IIR) filter values in consideration of shift displacement of taps rather than adding a previous value and a current value of the same tap in step S550. For example, if the fifth tap is shifted to the third tap, a channel estimation value of the current third tap should be added to accumulated channel estimation values of the previous fifth tap. The adding technique for channel estimation values may be referred to as a shift adding technique.

If a shift distance Dh of a tap is greater than a preset threshold value, the hopping tracking execution unit 250 interprets it as a new channel reception environment.

Figure 6:
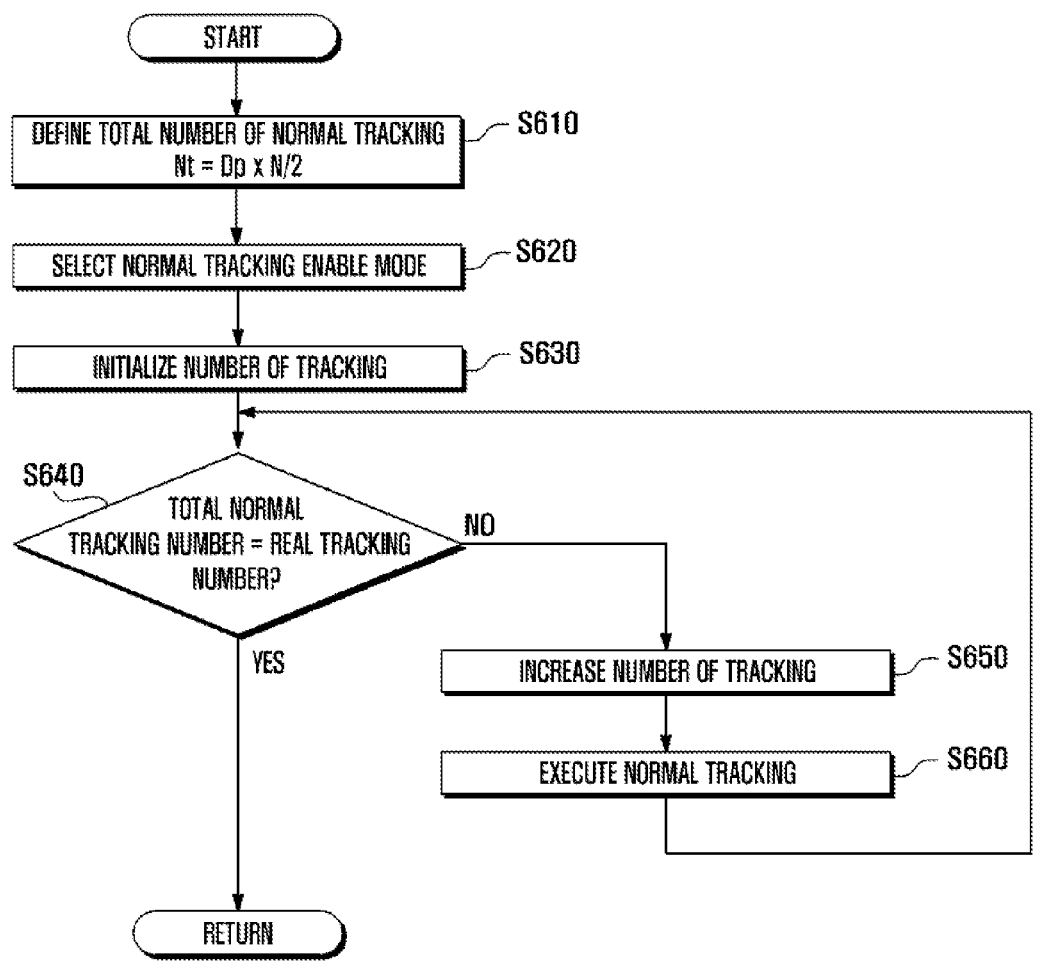
FIG. 6 is a flow diagram illustrating a normal tracking process in FIG. 3.

FIG. 6 is a flow diagram illustrating a normal tracking process in FIG. 3.

Referring to FIG. 6, in step S610, when normal tracking is approved, the normal tracking execution unit 240 defines the number of tracking times in Equation 7 below.

$$Nt=Dp*N/2$$ [Equation 7]

The normal tracking execution unit 240 selects a tracking enable mode in step S620. The tracking enable mode is not only to prevent unnecessary power consumption caused by frequently tracking in hardware clocks or PN clocks, but also to realize tracking adapted to a real channel environment. The tracking enable mode is to determine a cycle of an enable signal which may execute a 1/N tracking once. To classify the tracking enable mode, 512 chip cycle or multiples thereof, CPICH slot cycles, CPICH sub-frame cycles, or CPICH frame cycles may be used.

After the tracking enable mode is selected, the normal tracking execution unit 240 initializes the number of tracking times in step S630 and then executes tracking on a ½ chip basis in a preset cycle. Namely, the normal tracking execution unit 240 compares the total number of normal tracking times determined in step S610 with the number of real tracking times in step S640. If the number of the normal tracking times and the number of the real tracking times are not identical, the normal tracking execution unit 240 increases the number of tracking times in step S650 and then executes normal tracking in step S660.

On the contrary, if the number of determined tracking times is identical to the number of real tracking times, the normal tracking execution unit 240 finishes the execution of normal tracking.

Figure 7:
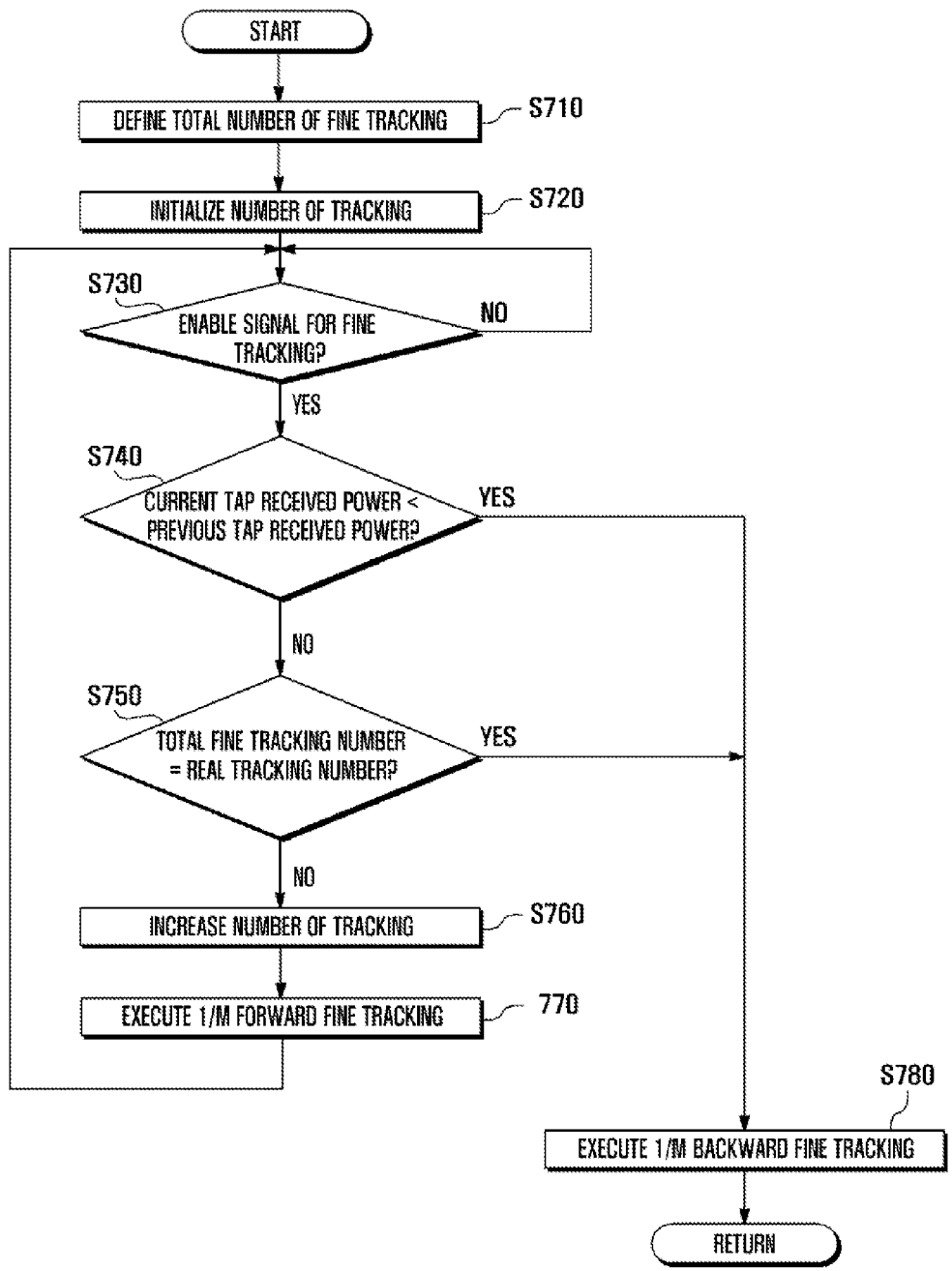
FIG. 7 is a flow diagram illustrating a fine tracking process in FIG. 3.

FIG. 7 is a flow diagram illustrating a fine tracking process in FIG. 3.

Referring to FIG. 7, in step S710, when fine tracking is approved; the fine tracking execution unit 230 defines the number of fine tracking times Nf(T) in Equation 8 below.

$$Nf(T)=M/2, M=4,8,16,$$ [Equation 8]

Here, the number of fine tracking times Nf(T) may correspond to a tracking window size of a fine tracking mode. Namely, a fine tracking mode is to correct the position of the maximum received energy tap on a 1/M chip basis within a half chip range.

In addition, the fine tracking execution unit 230 initializes the number of fine tracking times in step S720. The fine tracking execution unit 230 determines whether an enable signal for executing fine tracking is generated in step S730. If it is determined that the enable signal is generated, the fine tracking execution unit 230 proceeds to step S740.

In step S740, the fine tracking execution unit 230 compares received power at a current tap with received power at a previous tap. If the received power at the current tap is greater than the received power at the previous tap, the fine tracking execution unit 230 determines whether the number of real fine tracking times reaches the total number of fine tracking times in step S750. If it is determined that the number of real fine tracking times does not reach the total number of fine tracking times, the fine tracking execution unit 240 increases the number of fine tracking times by one in step S760 and then executes a 1/M chip forward fine tracking in step S770. The forward fine tracking performs tracking toward a direction of a lower received energy between P(L) and P(E) in Equation 6.

Meanwhile, if the received power at the previous tap is greater than the received power at the current tap in step S740, namely if a tap located at a previous tracking position has maximum received energy, the fine tracking execution unit 230 executes a 1/M chip backward fine tracking in step S780. The backward fine tracking is the opposite direction of the above-described forward fine tracking.

Figure 8:
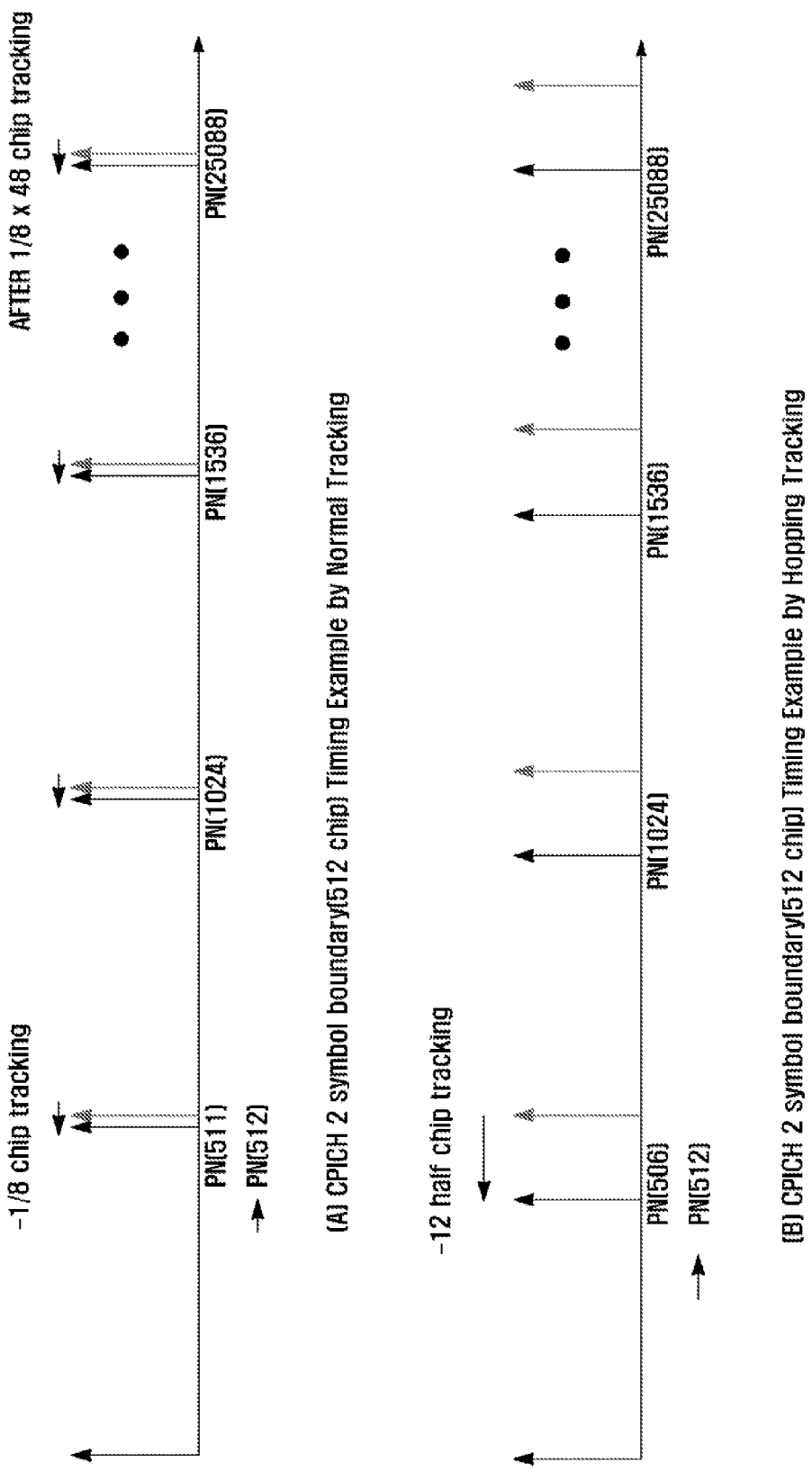
FIG. 8 is a view illustrating reasons for updating a Pseudo-Noise (PN) state in FIG. 5.

FIG. 8 is a view illustrating reasons for updating a PN state in FIG. 5.

Referring to (A) of FIG. 8, in a normal tracking mode, negative tracking is performed by less than one chip at once, namely on a ⅛ chip basis. Therefore, the 512-th PN state after tracking may be connected to the 511-th PN state before tracking. In such a manner, a normal tracking mode performs a total of 48 tracking times and shifts a tap to a desired position.

In a hopping tracking mode illustrated in (B) of FIG. 8, negative tracking is performed by six chips at once. Therefore, the 512-th PN state after tracking cannot be connected to the 506-th PN state before tracking. Namely, the 512-th PN state should be updated by the 506-th PN state according to a hopping distance.

Figure 9:
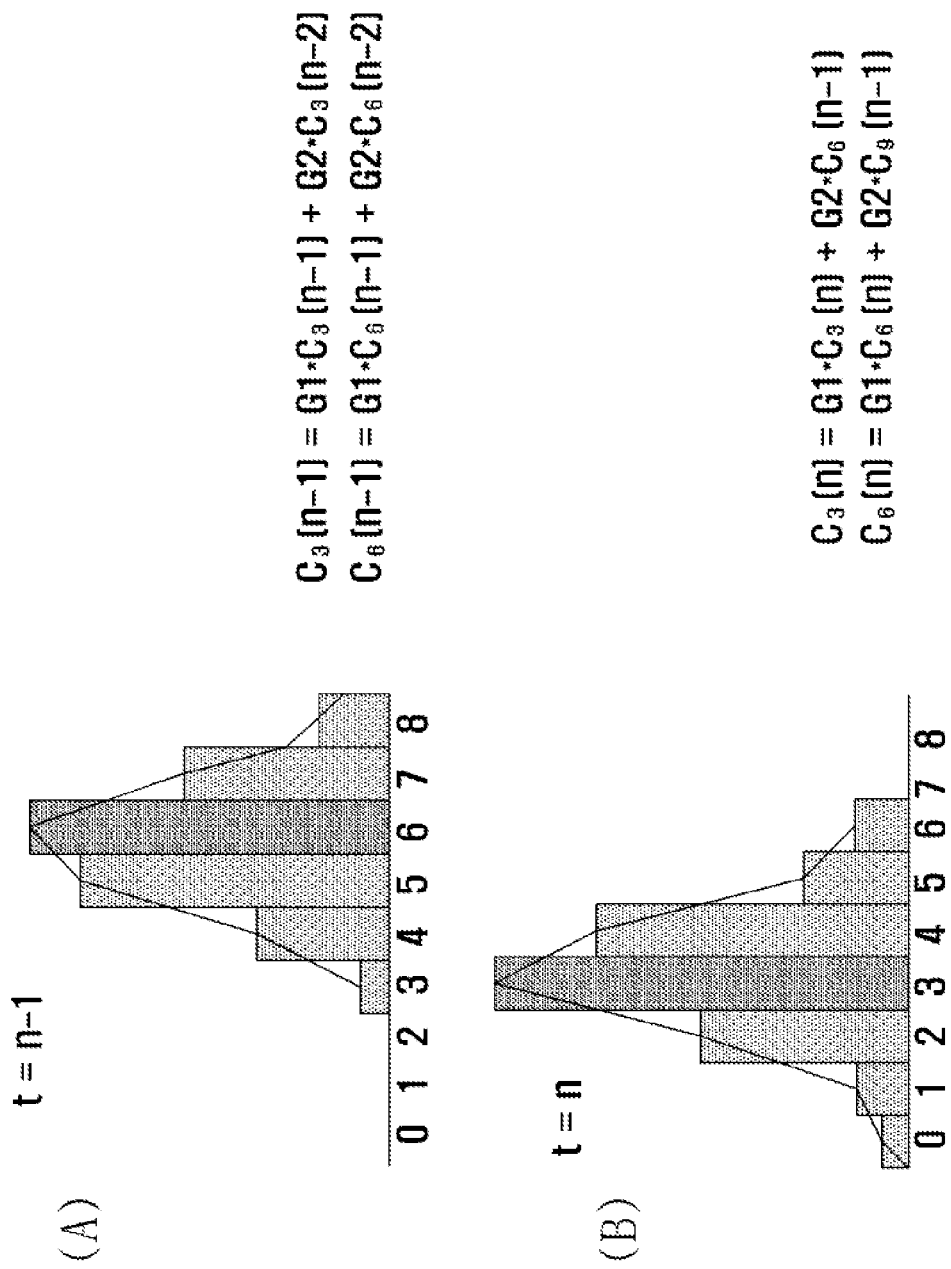
FIG. 9 is a view illustrating a concept of shift adding according to an exemplary embodiment of the present invention.

FIG. 9 is a view illustrating a concept of shift adding according to an exemplary embodiment of the present invention.

Referring to FIG. 9, (A) illustrates a scheme for adding channel estimation values of a third tap and a sixth tap before hopping tracking.

In this case, at the third tap, channel estimation values of a current time (t=n−1) and a previous time (t=n−2) are accumulatively added as illustrated in a numerical expression of (A). Similarly, at the sixth tap, channel estimation values of a current time and a previous time are accumulatively added as illustrated in a numerical expression of (A).

Meanwhile, (B) of FIG. 9 illustrates a scheme for adding channel estimation values of the third and sixth taps after hopping tracking.

In this case, at the third tap, channel estimation values of a current time (t=n) regarding the third tap and a previous time (t=n−1) regarding the sixth tap are accumulatively added in consideration of shift displacement of taps as illustrated in a numerical expression of (B).

Similarly, at the sixth tap, channel estimation values of a current time regarding the sixth tap and a previous time regarding a ninth tap are accumulatively added in consideration of shift displacement of taps as illustrated in a numerical expression of (B).

FIG. 10 is a view illustrating an executable example of a hopping tracking mode according to an exemplary embodiment of the present invention.

Referring to FIG. 10, a channel estimation apparatus receives the position of a reference tap (i.e., the fifth tap in (A)) with a maximum power from a searcher and then reconciles tap positions of the channel estimator and equalizer. In this case, the channel estimation apparatus may consider any tap appearing before a tap receiving the maximum power. The channel estimation apparatus disposes taps of a channel estimator within pre-offset.

As illustrated in (A), parts (0, 1, 2, and 3) of front channel estimating taps may not be activated as the result of a lock control. Since these inactivated taps are included in channel estimating taps, a conventional technique fails to include any multi-tap delay received values (i.e., values after an eleventh tap) after the maximum received energy tap in the channel estimator and equalizer. Accordingly, this may cause degradation of reception performance.

In order to prevent the degradation of reception performance, as illustrated in (B), the earliest tap (i.e., a fourth tap in (A)) may be shifted to the most preceding position (i.e., a first tap in (B)) of the channel estimation apparatus. Accordingly, it is possible to obtain more received energy of taps with multi-tap delay properties. Namely, the performance of the channel estimator and equalizer may be enhanced.

Figure 11:
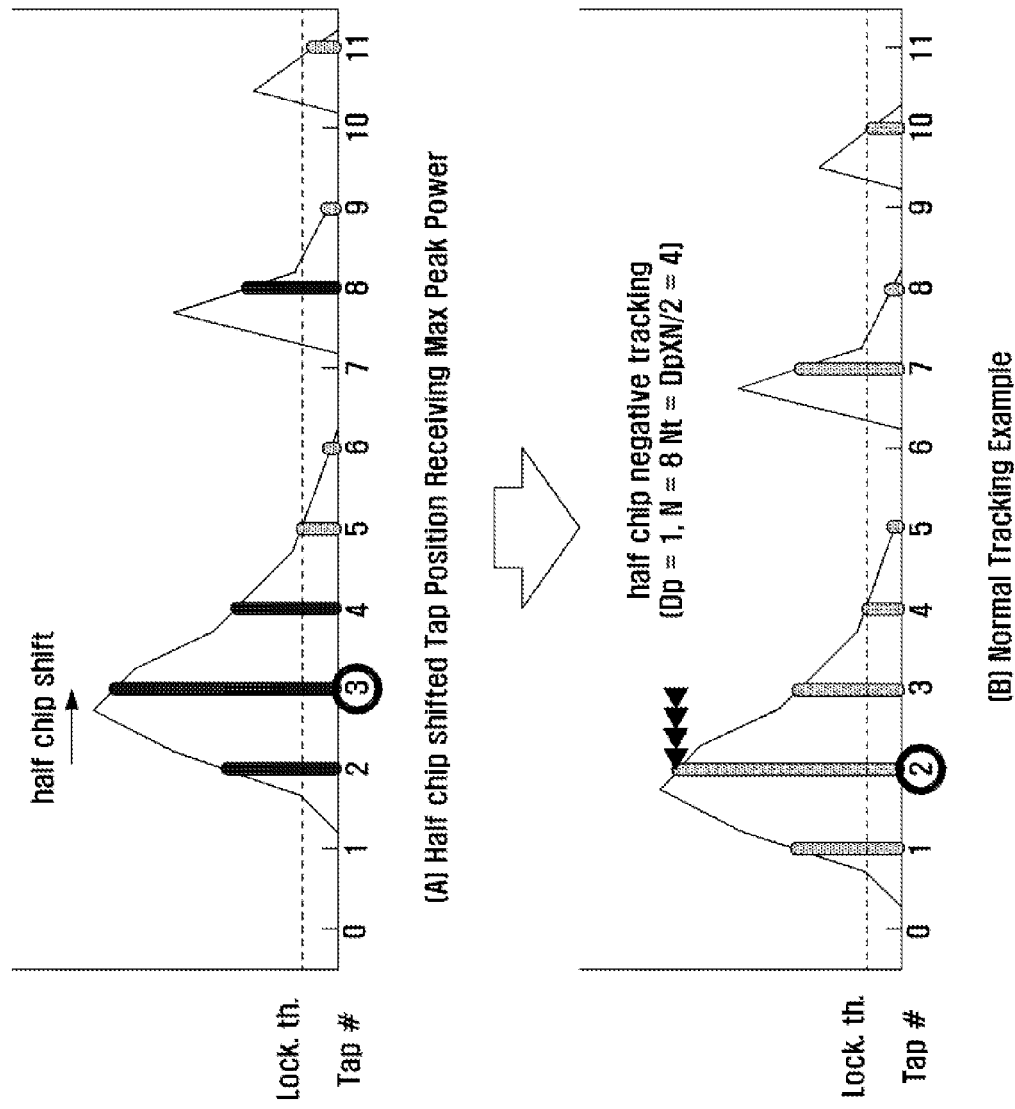
FIG. 11 is a view illustrating an executable example of a normal tracking mode according to an exemplary embodiment of the present invention.

FIG. 11 is a view illustrating an executable example of a normal tracking mode according to an exemplary embodiment of the present invention.

Referring to FIG. 11, the position of a reference tap is shifted by a half chip from a second tap to a third tap when a maximum peak power receiving position is changed from the second tap position to the third tap position after (B) in FIG. 10.

A conventional normal tracking is performed in a cycle of a hardware clock or a PN clock which may cause unnecessary power consumption. In contrast, in an exemplary implementation of the present invention, a tracking enable mode is selected by using the total number of tracking times such that the mode may operate in a cycle of multiples of 512 chips, CPICH slot, CPICH sub-frame, CPICH frame, and the like. Therefore, it is possible to prevent unnecessary power consumption.

FIG. 12 is a view illustrating an executable example of a fine tracking mode according to an exemplary embodiment of the present invention.

Referring to FIG. 12, a fine tracking mode expands tracking, performed with resolution of a half chip as illustrated in FIG. 11, into a 1/M chip (e.g., M is more than 2 and M=4, 8, 16, . . . ).

In FIG. 12, (A) illustrates forward fine tracking. Since a third tap is a maximum peak power receiving tap, a channel estimation apparatus determines a fine tracking parameter ND, namely a normalized value of received power in a second tap and a fourth tap adjacent to the maximum peak power receiving tap. If a fine tracking parameter is greater than a preset fine tracking threshold value, the channel estimation apparatus shifts a reference tap to the fourth tap with lower received power on a 1/M chip basis.

As illustrated in (B) of FIG. 12, if a fine tracking parameter becomes smaller than a preset fine tracking threshold value during execution of the fine tracking mode, the channel estimation apparatus performs backward tracking once so that a reference tap may receive the maximum power at the previous third tap.

Namely, the fine tracking mode expands a resolution up to 1/M chip and allows channel estimation without lowering reception performance under channel conditions requiring high rate data transmission such as 16 Quadrature Amplitude Modulation (QAM) or 64 QAM.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel estimation apparatus for executing a time tracking in a mobile communication system, the apparatus comprising:
a channel estimation control unit for analyzing and outputting a delay profile of a multipath channel by using a channel estimation value of each of a plurality of multi-taps;
a tracking mode control unit for calculating an interval between an earliest tap and a preset margin tap by using the delay profile analysis results, and for generating and outputting a hopping tracking control signal for tracking a position of the earliest tap to a position of the margin tap by the calculated interval in a single step when the calculated interval is greater than a preset hopping threshold value; and
a hopping tracking mode execution unit for receiving the hopping tracking control signal and for shifting the position of the earliest tap to the position of the margin tap in a single step.

2. The apparatus of claim 1, further comprising:
a sampler for performing sampling of a received signal according to the shifted multi-tap; and
a multi-tap sub-channel estimation unit for outputting a channel estimation value for each multi-tap by using a sampling signal received from the sampler.

3. The apparatus of claim 1, further comprising:
a sequential tracking mode execution unit,
wherein the tracking mode control unit further generates and outputs a sequential tracking control signal for tracking a position of the multi-tap on a 1/N chip basis so that the position of the multi-tap agrees with a maximum peak power receiving position when the calculated interval is smaller than the preset hopping threshold value, and
wherein the sequential tracking mode execution unit receives the sequential tracking control signal and shifts the position of the multi-tap on a 1/N chip basis.

4. The apparatus of claim 1, wherein the hopping tracking mode execution unit further calculates a shift interval between the position of the earliest tap and the position of the margin tap when the position of the earliest tap is greater than the position of the margin tap, compares the shift interval with the preset hopping threshold value, and tracks the position of the earliest tap to the position of the margin tap by the calculated interval in a single step.

5. The apparatus of claim 1, wherein the hopping tracking mode execution unit further updates a PN state according to a hopping interval after performing hopping tracking.

6. The apparatus of claim 3, wherein the multi-tap sub-channel estimation unit further adds a current channel estimation value and a previous channel estimation value of a specific tap according to shift displacement of each multi-tap.

7. The apparatus of claim 3, wherein the sequential tracking mode execution unit includes a normal tracking mode execution unit for performing a normal tracking on a ½ chip basis and a fine tracking mode execution unit for performing a fine tracking on a 1/M chip basis wherein M is an integer comprising a value of more than 2.

8. The apparatus of claim 7, wherein the normal tracking on the ½ chip basis is performed when a position of a maximum peak power receiving tap is changed.

9. The apparatus of claim 7, wherein the fine tracking on the 1/M chip basis is performed when at least one of the position of the maximum peak power receiving tap is fixed and after the normal tracking is performed.

10. The apparatus of claim 7, wherein the tracking mode control unit further determines a difference in a received energy between a half-chip prior tap and a half-chip post tap to the maximum received energy tap, determines a fine tracking parameter by normalizing the difference divided by a received energy of the maximum received energy tap, and generates and outputs a fine tracking control signal for tracking on a 1/M chip basis when the fine tracking parameter is greater than a preset fine threshold value.

11. A time tracking method for a channel estimation of a mobile communication receiver, the method comprising:
analyzing a delay profile of a multipath channel by estimating a channel for a received multipath signal;
determining an interval between an earliest tap and a preset margin tap by using the delay profile analysis results; and
performing a hopping tracking for tracking a position of the earliest tap to a position of the margin tap by the determined interval in a single step when the determined interval is greater than a preset hopping threshold value.

12. The method of claim 11, further comprising:
performing sequential tracking for tracking the position of the reference tap on a 1/N chip basis so that the position of the reference tap agrees with a maximum peak power receiving position when the determined interval is smaller than the preset hopping threshold value.

13. The method of claim 12, wherein the analyzing of the delay profile comprises:
determining a time average power of each tap by receiving a channel estimation value of each multi-tap from the received multipath signal;
determining a moving average of each tap by using the time average power; and
determining a maximum peak power position by using the moving average.

14. The method of claim 13, wherein the performing of the hopping tracking comprises:
determining a shift interval between the position of the earliest tap and the position of the margin tap when the position of the earliest tap is greater than the position of the margin tap;
comparing the shift interval with the preset hopping threshold value; and
tracking the position of the earliest tap to the position of the margin tap by the determined interval in a single step when the shift interval is greater than the hopping threshold value.

15. The method of claim 14, wherein the performing of the hopping tracking further includes updating a PN state according to a hopping interval after the hopping tracking.

16. The method of claim 15, wherein the performing of the hopping tracking further includes adding a current channel estimation value and a previous channel estimation value of a specific tap according to shift displacement of each multi-tap.

17. The method of claim 12, wherein the performing of the sequential tracking comprises:
performing a normal tracking on a ½ chip basis when a position of a maximum peak power receiving tap is changed; and
performing a fine tracking on a 1/M chip basis when at least one of the position of the maximum peak power receiving tap is fixed and after the normal tracking is performed,
wherein M is integer comprising a value of more than 2.

18. The method of claim 17, wherein the performing of the fine tracking comprises:
- determining a difference in a received energy between a half-chip prior tap and a half-chip posterior tap to the maximum received energy tap;
- determining a fine tracking parameter by normalizing the difference divided by a received energy of the maximum received energy tap; and tracking on a 1/M chip basis when the fine tracking parameter is greater than a preset fine threshold value.

\* \* \* \* \*